US006648402B2

United States Patent
Scheib et al.

(10) Patent No.: US 6,648,402 B2
(45) Date of Patent: Nov. 18, 2003

(54) STRUCTURAL SUPPORT BRACE

(75) Inventors: Charles Joseph Scheib, Kettering, OH (US); Stephen Moore Pitrof, Bellbrook, OH (US); Young I Moon, Troy, OH (US); George Frank Richards, Springfield, OH (US)

(73) Assignee: Delphi Technologies, Inc., Troy, MI (US)

( * ) Notice: Subject to any disclaimer, the term of this patent is extended or adjusted under 35 U.S.C. 154(b) by 121 days.

(21) Appl. No.: 09/805,683

(22) Filed: Feb. 22, 2001

(65) Prior Publication Data

US 2002/0024236 A1 Feb. 28, 2002

Related U.S. Application Data

(60) Provisional application No. 60/184,002, filed on Feb. 22, 2000, and provisional application No. 60/183,949, filed on Feb. 22, 2000.

(51) Int. Cl.[7] .............................................. B60R 27/00
(52) U.S. Cl. ..................... 296/203.02; 296/70; 296/72; 296/208; 180/90; 280/779
(58) Field of Search ................................. 296/192, 194, 296/70, 72, 203.02, 208; 180/90; 280/779

(56) References Cited

U.S. PATENT DOCUMENTS

| | | | | |
|---|---|---|---|---|
| 4,400,011 A | * | 8/1983 | Matsuno ...................... 180/90 |
| 4,893,834 A | | 1/1990 | Honda et al. ................ 280/751 |
| 5,326,130 A | | 7/1994 | Gedeon et al. .............. 280/752 |
| 5,556,153 A | | 9/1996 | Kelman et al. ................ 296/70 |
| 5,564,769 A | | 10/1996 | Deneau et al. ................ 296/72 |
| 5,676,216 A | | 10/1997 | Palma et al. .................. 180/90 |
| 5,709,601 A | | 1/1998 | Heck .......................... 454/121 |
| 5,865,468 A | | 2/1999 | Hur ............................. 280/752 |
| 5,931,520 A | * | 8/1999 | Seksaria et al. ............. 280/752 |
| 5,957,498 A | | 9/1999 | Holland et al. .............. 280/779 |
| 5,979,965 A | | 11/1999 | Nishijima et al. ............ 296/70 |
| 6,027,088 A | | 2/2000 | Stedman et al. ............. 248/200 |
| 6,110,037 A | | 8/2000 | Yoshinaka ................... 454/143 |
| 6,145,880 A | | 11/2000 | White et al. ................. 280/752 |
| 6,186,546 B1 | | 2/2001 | Uhl .............................. 280/751 |
| 6,234,569 B1 | * | 5/2001 | Derleth et al. .............. 280/779 |

FOREIGN PATENT DOCUMENTS

| | | | | |
|---|---|---|---|---|
| EP | 0960785 A2 | | 12/1999 | ......... B60R/21/045 |
| GB | 2110616 A | * | 6/1983 | ................. 180/90 |
| JP | 401030839 A | * | 2/1989 | ................ 296/192 |
| JP | 02164622 A | * | 6/1990 | ................. 180/90 |
| JP | 01240383 A | * | 9/1998 | ................ 208/779 |
| JP | 2000103307 | | 4/2000 | ......... B60R/21/045 |
| WO | WO 00/50292 | | 8/2000 | ........... B62D/25/14 |

OTHER PUBLICATIONS

International Search Report, corresponding to International Application No. PCT/US 01/40389, dated Mar. 28, 2001 and a copy of each of the publications cited therein.

* cited by examiner

Primary Examiner—D. Glenn Dayoan
Assistant Examiner—Lori L Coletta
(74) Attorney, Agent, or Firm—Kathryn A. Marra

(57) ABSTRACT

A structural member for providing a structural load path from a structural system to the floor of a vehicle is provided. The structural member has a stud plate with a plurality of studs extending therefrom. The studs are adapted to structurally connect to the steering column support structure, the structural system, and the center brace. The center brace also includes a plurality of molded attachment features for integrally attaching vehicle components to the center brace.

24 Claims, 11 Drawing Sheets

STRUCTURAL SUPPORT BRACE

CROSS REFERENCE TO RELATED APPLICATIONS

This application claims the benefit of U.S. Provisional Patent Application Ser. No. 60/184,002, filed on Feb. 22, 2000, the contents of which are incorporated herein by reference thereto.

This application is also related to U.S. Patent Application Ser. No. 60/183,949, filed Feb. 22, 2000, and No. 60/184,043, filed Feb. 22, 2000, which are commonly owned by Delphi Technologies, Inc., the contents of which are incorporated herein by reference thereto. In addition, this application is related to U.S. Pat. No. 5,934,744, the contents of which are also incorporated herein by reference thereto.

TECHNICAL FIELD

This application relates to structural support braces, and more particularly, to a load support member for use in vehicle bodies.

BACKGROUND OF THE INVENTION

In an automobile, a structural beam is used to support such structural pieces as the instrument panel assembly, the HVAC air duct system, and the steering column support structure.

Therefore, one feature of the cross car structure is to serve as a load bearing surface. The cross car structure typically is attached to other vehicle components and therefore this structure provides a suitable surface which acts as a load bearing surface for supporting the load of the other vehicle components. Structural beams are used in the bodies of vehicles to provide structural strength between the A-pillars in the front of the passenger and/or driver compartment. Such beams are also used to serve as a reaction surface for occupant protection devices such as airbags or knee bolsters.

Often, other vehicle components are attached to the cross car structure. For example, one such vehicle component which is suitably attached to the cross car structure is a steering column support structure. The steering column support structure typically comprises a rather large member, and therefore a significant load is applied to the cross car structure when the steering column support structure is mounted thereto. Furthermore, the attachment of the steering column support structure to the cross car structure places the components under stress, especially at the points of attachment therebetween. It would therefore be desirable to provide a load bearing structure to which the steering column support assembly may be attached so that the load is effectively dispersed to the vehicle floor.

SUMMARY OF THE INVENTION

A structural member for providing a structural load path from a vehicle structural member, the structural member makes contact with a portion of a vehicle frame at one end and the vehicle structural member at the other end. The structural member further includes a center brace portion being secured to one of the structural members at one end and to the other structural member at the other end.

The above-described and other features and advantages of the present invention will be appreciated and understood by those skilled in the art from the following detailed description, drawings, and appended claims.

BRIEF DESCRIPTION OF THE DRAWINGS

The present invention will now be described, by way of example, with reference to the accompanying drawings, in which.

DETAILED DESCRIPTION OF THE INVENTION

Figure 1:
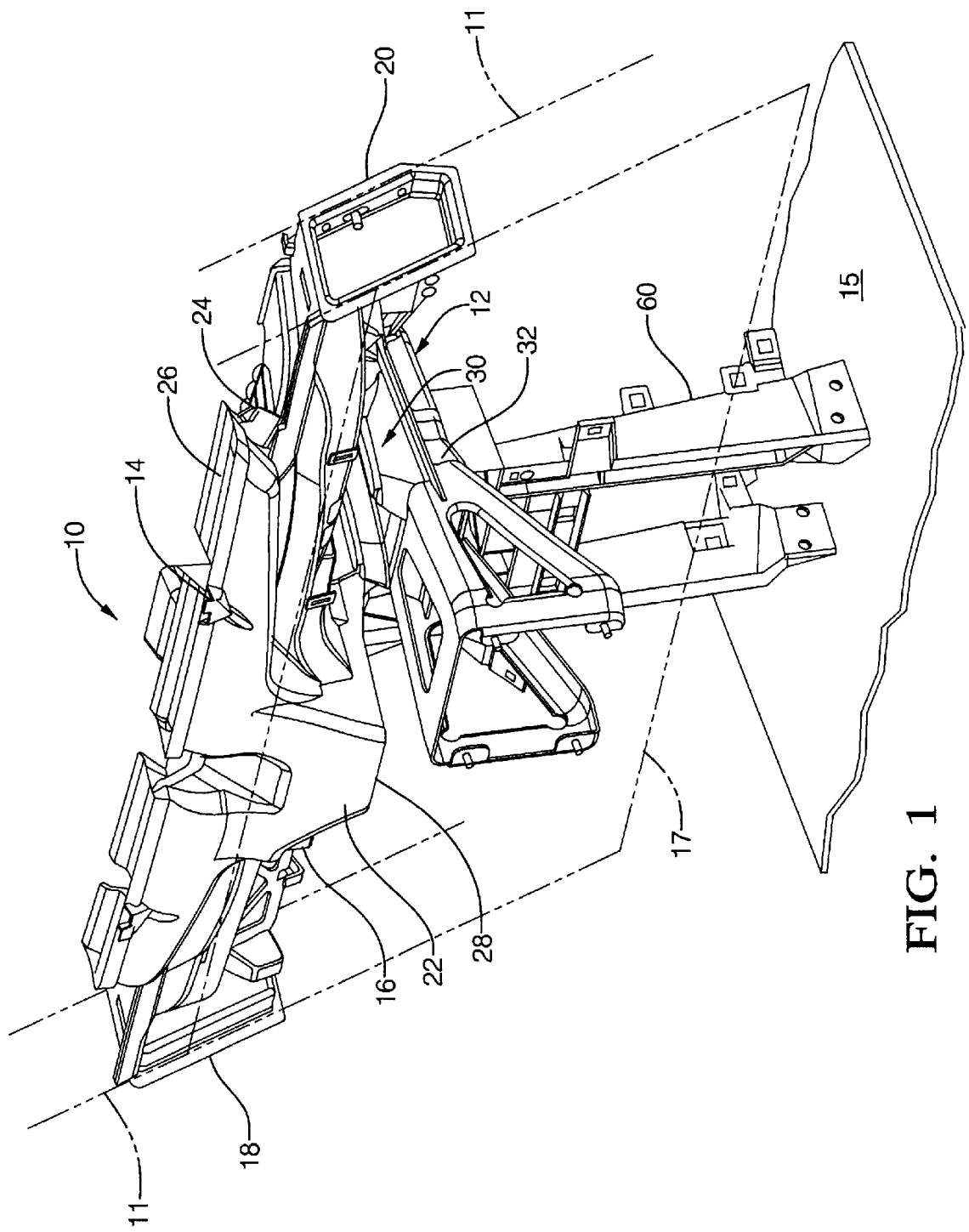
FIG. 1 is a perspective view of a structural member with a steering column support structure and a center structural member attached thereon.
Figure 5:
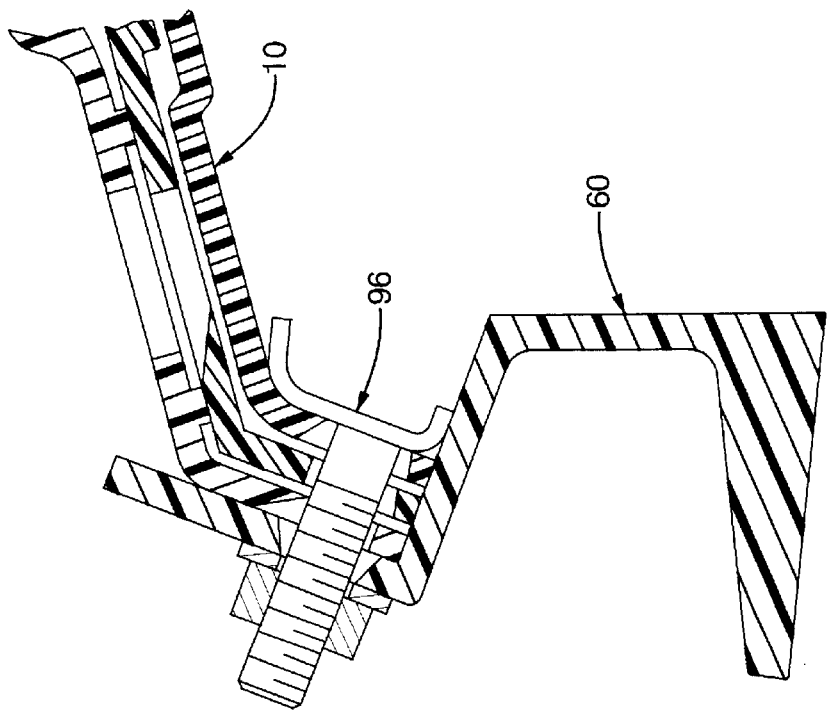
FIG. 5 is a view along lines 5—5 of FIG. 4.

Referring now to FIG. 1, numeral 10 generally indicates a structural member. Structural member 10 extends between front A-pillars 11 of a vehicle frame. Structural member 10 provides a mounting surface as well as a means for displacing loads applied to structural components of a vehicle. Such structural components include, but are not limited to, the following: steering column; knee bolsters, and passenger restraint systems. Structural member 10 has sufficient strength and stiffness to support static and dynamic loads created by the supported items, as well as to absorb impact loading which may be transferred from the steering column, knee bolsters, and passenger airbags. Structural member 10 also provides a passageway for a plurality of HVAC ducts 23.

More particularly, with the complexity of vehicle interior designs and additional instrument features, to compensate for this additional load, structural member 10 must be structurally strengthened to support such a load.

In an exemplary embodiment, structural member 10 provides a load path from the structural member and a steering column support structure 12 to a floor 15 of the vehicle. This design utilizes the strength of vehicle floor 15 as a means for supporting the loads.

Advantageously, by utilizing such a support structure, configuration manufacturers can minimize the size of the structural member in order to reduce the weight of the structural member and ultimately reduce the weight of the vehicle without affecting the structural integrity and rigidity of the structural member. The reduced weight of the vehicle will therefore result in better fuel efficiency.

Figure 2:
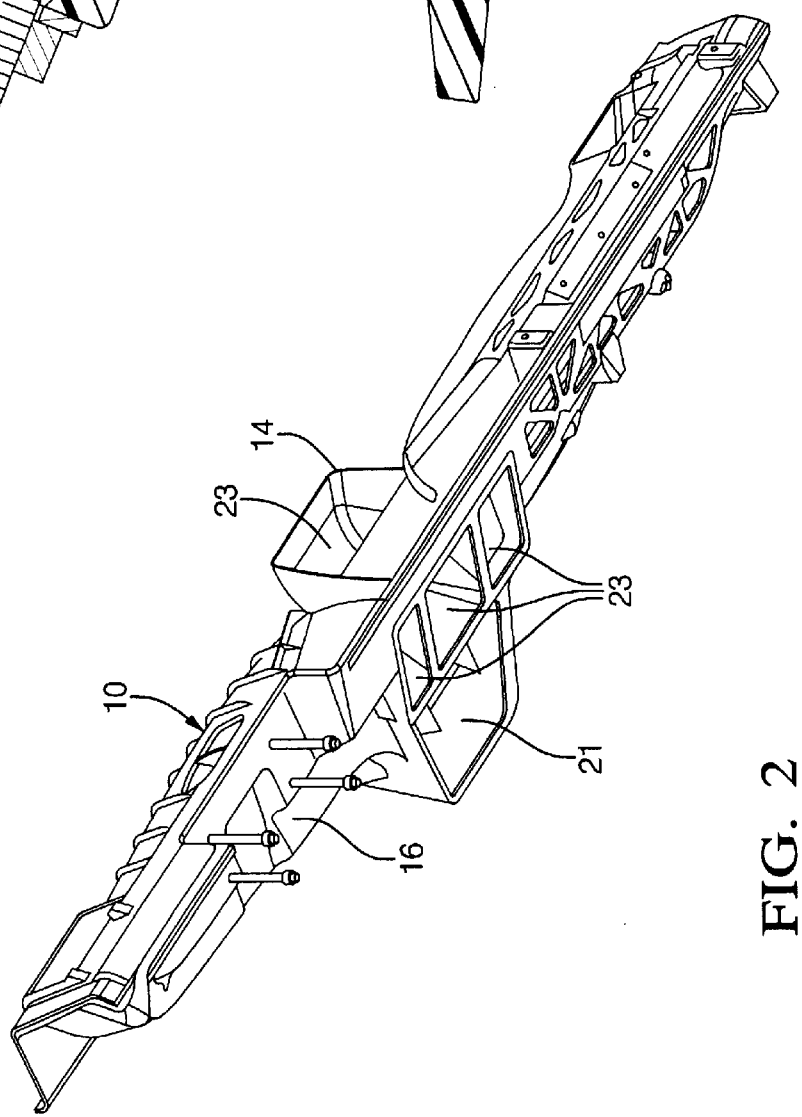
FIG. 2 is a front perspective view of the structural member of FIG. 1.

Referring now to FIGS. 1 and 2, structural member 10 is formed of a plurality of sections defining a number of duct passageways that are formed within structural member 10. Alternatively, structural member 10 is constructed out of a single member. Accordingly, and depending on the manufacture/construction of structural member 10, the materials used for the same may vary. The duct passageways carry and direct air to predetermined locations within the passenger compartment of the vehicle.

For example, and in an application where the structural member comprises a first section 14 and a second section 16, this can be complementary in nature so as to permit the two to mate with each other to form structural member 10. First and second sections 14 and 16 may be secured to one another by any number of means depending on the type of material used for sections 14 and 16. For example, and when sections 14 and 16 are molded out of plastic, a vibration welding process can be employed in order to secure first and second sections 14 and 16 to each other. Alternatively, structural member 10 may be made out of a plurality of sections, each defining a portion of structural member 10.

Structural member 10 is positioned to traverse the width of a vehicle and is mounted to vehicle A-pillars 11 at mountings 18 and 20 extending in a cross car direction. Structural member 10 is defined by a rear side 22, generally located proximate to an engine wall 17, and a front side 24 located opposite rear side 22 and proximate to the vehicle occupant compartment when structural member 10 is assembled within the vehicle. Structural member 10 also includes an upper surface 26 and a lower surface 28.

Generally, structural member 10 is coupled to a heating, ventilating, and air conditioning module, referred to as an HVAC module (not shown). The HVAC module is disposed within the vehicle in fluid communication with structural air ducts 23 and generally comprises a hollow housing within which are contained heat exchangers and various airflow directing devices.

As best shown in FIG. 2, both first and second sections 14 and 16 contain at least one opening 21 which is designed to communicate with the HVAC module so as to receive the tempered air from the HVAC module. Further, first and second sections 14 and 16 include a plurality of ducts 23 which may be located proximate to the windshield, or in the alternative, on second section 16 and proximate to vehicle floor 15, which are used as air-conditioning and/or cooling outlets.

Figure 3:
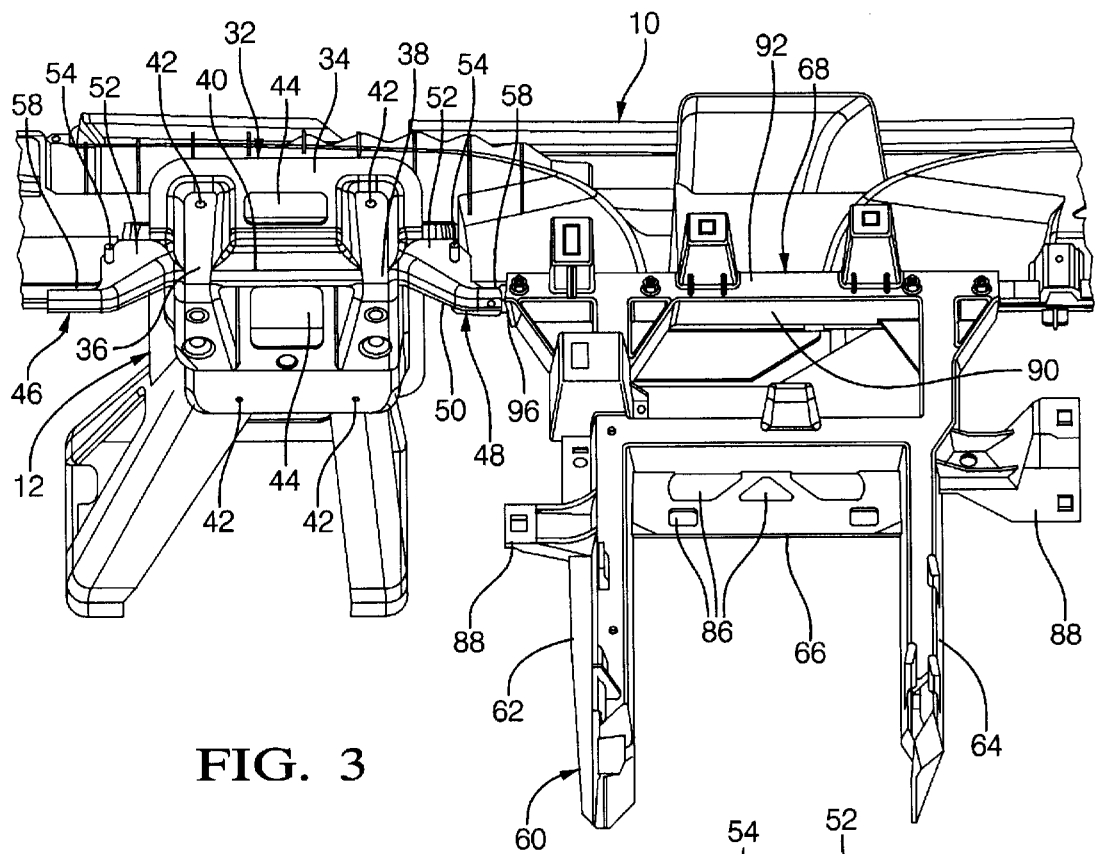
FIG. 3 is a front view of a portion of the structural member of FIG. 1 with a steering column support structure and a center structural member attached thereon.

Referring now to FIGS. 1–3, steering column support structure 12 is illustrated as attached to lower surface 28 of structural member 10, such that steering column support structure 12 extends from structural member 10 towards engine wall 17. Engine wall 17 is located proximate to the front of the vehicle body and generally separates the engine from the vehicle occupant compartment.

Steering column support structure 12 includes a first surface 30 and a second surface 32 located opposite each other. First surface 30 is disposed adjacent to structural member 10. First and second surfaces 30 and 32 are mounted to one another using suitable techniques such as, but not limited to, welding or bolting, to form steering column support structure 12. The steering column is mounted onto the second surface 32 of steering column support structure 12 and carries the weight of the steering column. First and second surfaces 30 and 32 may be made of material such as steel having sufficient structural integrity and rigidity to support the steering column.

Second surface 32 of steering column support structure 12 includes a flange portion 34 formed adjacent to the flange portion of first surface 30, such that flange portion 34 is proximate to structural member 10 when steering column support structure 12 is mounted on structural member 10. Second surface 32 further includes a first protuberance 36 and a second protuberance 38, formed proximate to the side edges of second surface 32 of steering column support structure 12, such that protuberances 36 and 38 extend along the length of steering column support structure 12 from structural member 10 to engine wall 17 when steering column support structure 12 is assembled on structural member 10.

Second surface 32 includes a third protuberance 40, substantially centrally positioned, and extends perpendicular to and in between first protuberance 36 and second protuberance 38. Additionally, second surface 32 includes a plurality of mounting holes 42 formed therein for mounting the steering column to steering column support structure 12. Second surface 32 also includes apertures 44 for contributing to the reduction in mass of steering column support structure 12 without jeopardizing the structural integrity and rigidity of second surface 32.

Figure 4:
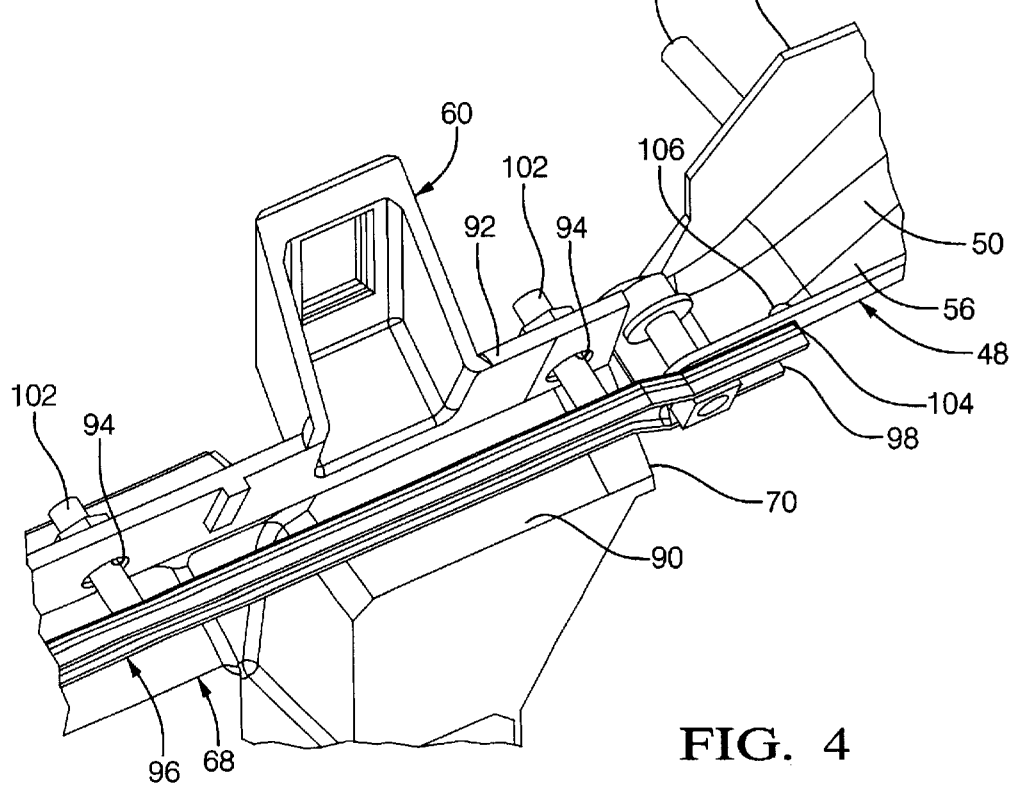
FIG. 4 is an enlarged view of the attachment point for the center structural member of the present invention.
Figure 6:
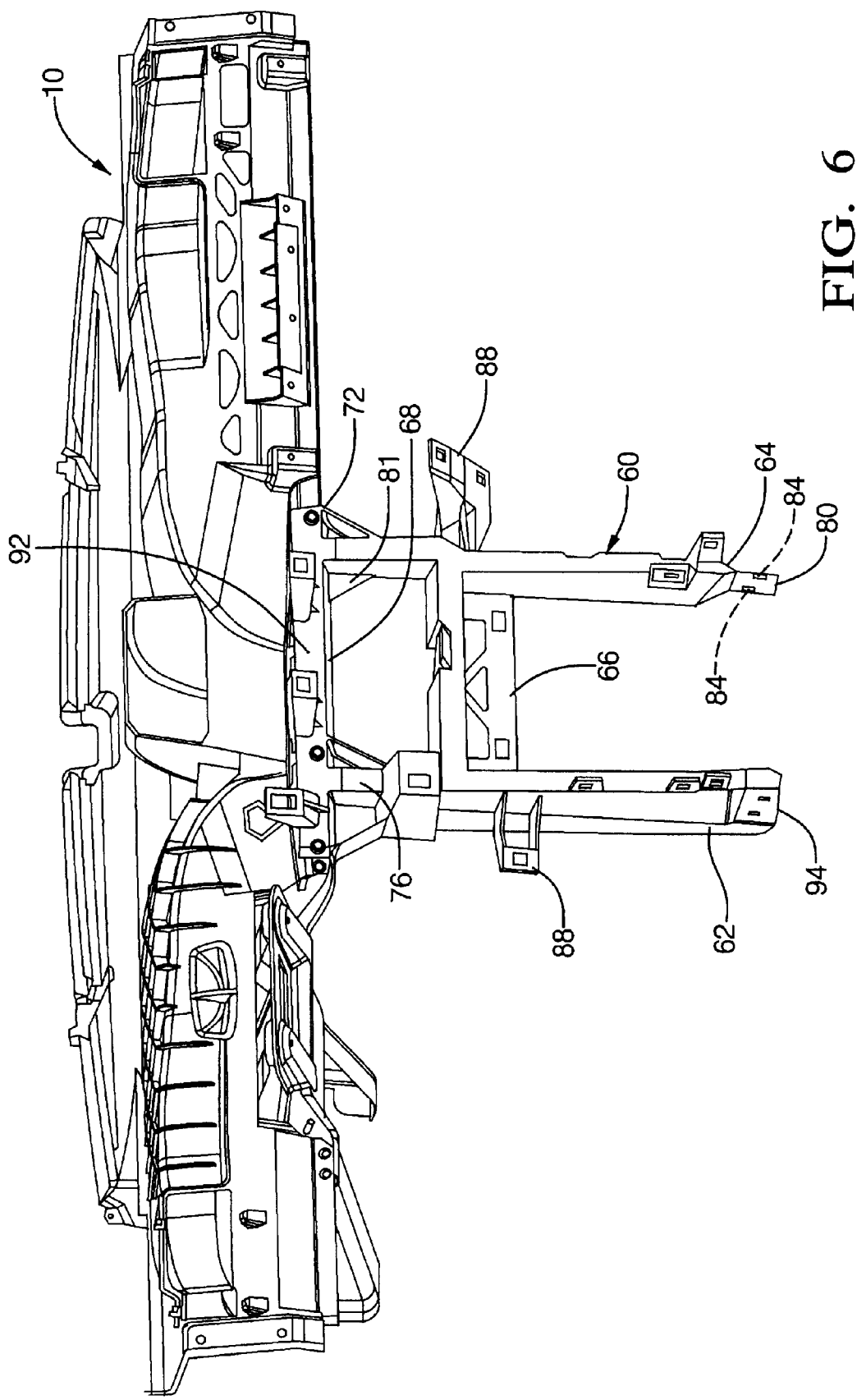
FIG. 6 is another front perspective view of the structural member of FIG. 3.
Figure 7:
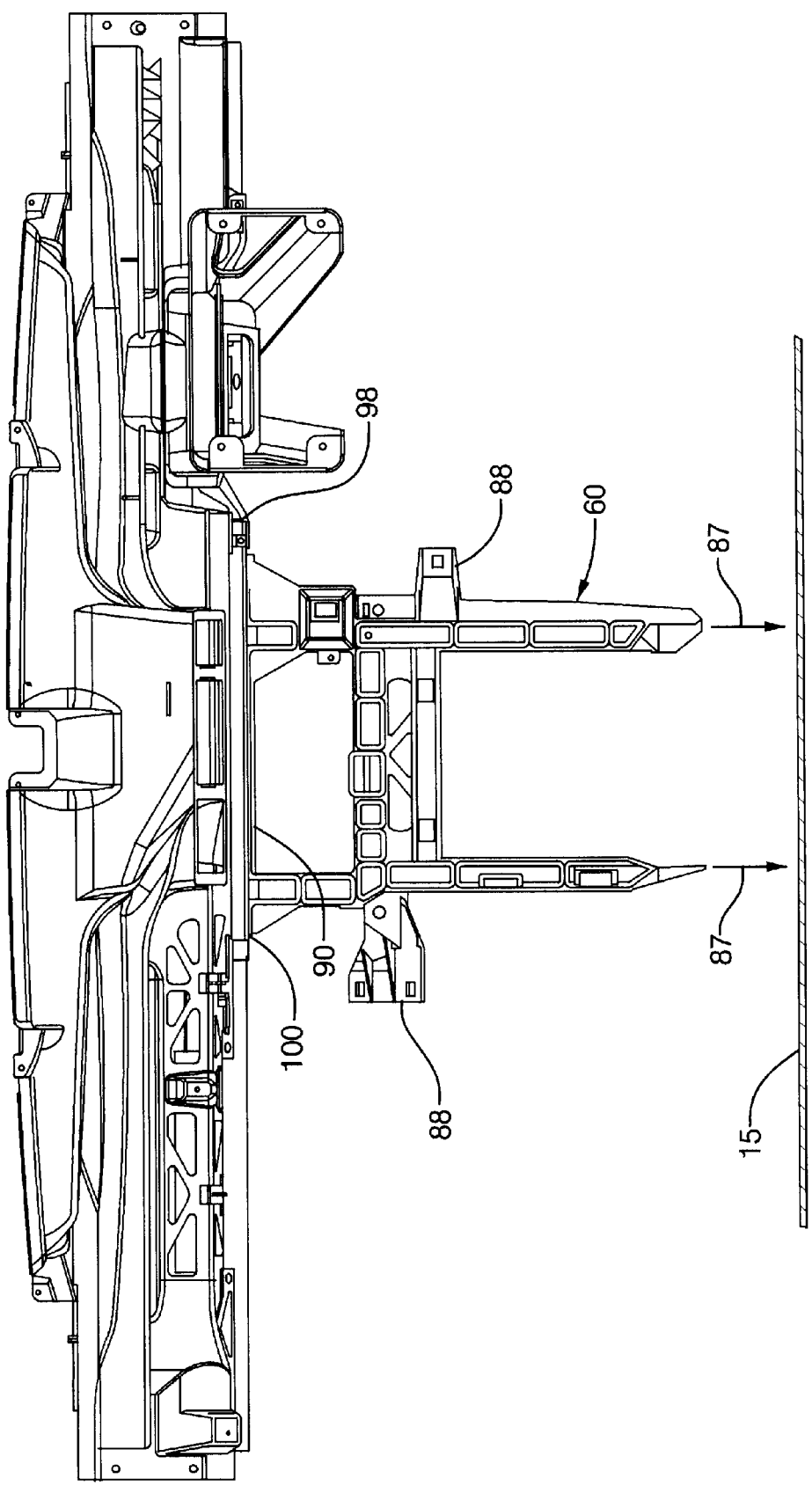
FIG. 7 is a rear plan view of the structural member of FIG. 6.
Figure 8:
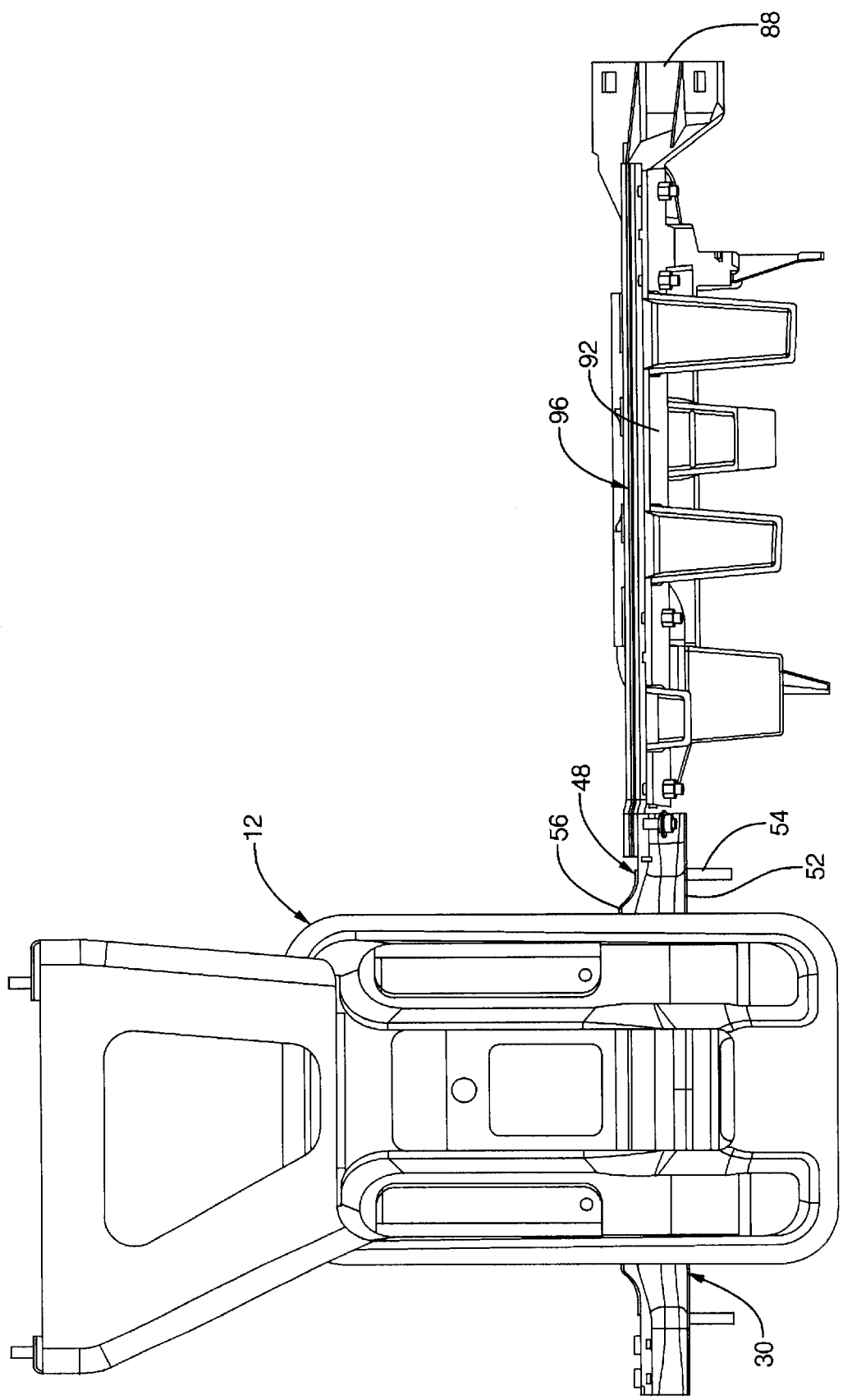
FIG. 8 is a top plan view of a center structural member attached to the steering column support structure in accordance with the present invention.

Referring to FIGS. 3 and 4, second surface 32 of steering column support structure 12 further includes a first mounting arm 46 and a second mounting arm 48, each preferably formed integral to second surface 32 as one piece, and each extending outwardly from the side edges of second surface 32. Preferably, first and second mounting arms, 46 and 48, are identically designed with the same components and dimensions, differing only in that they mirror one another. Thus, the structural components of first and second mounting arms, 46 and 48, will be discussed simultaneously with the understanding that they are mirrored formations of one another.

Mounting arms 46 and 48 each include a base flange 50 which extends downwardly and away from side edges of second surface 32. A pin flange 52 rises vertically from base flange 50 such that pin flange 52 is located proximate to structural member 10 when steering column support structure 12 is assembled thereon. Pin flange 52 includes a pin 54 disposed so that it extends away from base flange 50. Each mounting arm 46 and 48 further includes a bolt flange 56 formed on base flange 50 opposite pin flange 52 such that bolt flange 56 rises substantially vertically from base flange 50. Thus, bolt flange 56 faces pin flange 52. Bolt flange 56 also includes holes 58 for receiving fastening members.

Mounting arms 46 and 48 facilitate the mounting of steering column support structure 12 to structural member 10. As will be described herein in greater detail, in order to provide a load path from structural member 10 and steering column support structure 12 directed to floor 15 of the vehicle body, a center structural member or brace 60 is also assembled on structural member 10 and attached to steering column support structure 12 at mounting arm 48.

The steering column support structure 12 further includes a bracket portion 45 extending therefrom. The bracket portion 45 includes a plurality of pegs 47 extending toward the engine wall 17. Pegs 47 are received by engine wall 17 and retained thereby, thus facilitating mounting of steering column support structure 12 with engine wall 17.

Referring now to FIGS. 3–8, center structural brace 60 provides a means for support and of a load path for structural member 10 and steering column support structure 12. In addition, structural brace 60 provides an integral attachment site for vehicle interior components such as stereo components, radio cassette players, vehicle controls for the HVAC system, and ashtray storage compartment.

Center structural brace 60 may be manufactured having several structural components attached to one another. It should be appreciated that center structural brace 60 may also be molded as a one piece structure. For example, center structural brace 60 may be formed through an injection molding process, or alternatively, an extrusion deposition compression molding (EDCM) process, otherwise known as extrusion compression molding, or back compression molding, or compression molding of molten thermoplastic materials. In addition, and as another alternative, center structural brace 60 may also be manufactured out of stamped steel.

It is also noted that structural member 10 may be manufactured out of any one of the preceding processes.

Center structural brace 60 includes a first leg 62 and an opposing second leg 64 preferably parallel to one another and generally defining the outer boundaries of center structural brace 60. Of course, it is contemplated that first and second legs 62 and 64 of structural brace 60 may have a configuration other than parallel with respect to each other. For example, legs 62 and 64 may be configured to have an angular configuration wherein the distance between legs 62 and 64 varies. Center structural brace 60 further includes a first structural beam 66 spanning the width of the brace and attaching first leg 62 and second leg 64 together. A second structural beam 68, which provides for the location of attaching center structural brace 60 to structural member 10 and steering column support structure 12, has a first end 70 and second end 72 spanning the width of center structural brace 60, attaching first leg 62 and second leg 64 together.

First leg 62 includes a proximal end 74 and a distal end 76, wherein proximal end 74 provides for attaching center structural brace 60 to floor 15 of the vehicle, and distal end 76 attaches to second structural beam 68. Thus, first leg 62 extends downwardly from second structural beam 68 to floor 15 of the vehicle. First leg 62 preferably includes a plurality of apertures 78 disposed at proximal end 74 for receiving a fastening means such as screws or bolts for attaching to floor 15 of the vehicle.

Second leg 64 similarly includes a proximal end 80 and a distal end 82 wherein proximal end 80 provides for attaching center structural brace 60 to floor 15 of the vehicle, and distal end 82 attaches to second structural beam 68. Thus, second leg 64 extends downwardly from second structural beam 68 to floor 15 of the vehicle. Second leg 64 preferably includes a plurality of apertures 84 disposed at proximal end 80 for receiving a fastening means such as screws or bolts to attach to floor 15 of the vehicle.

Therefore, center structural brace 60 is defined by first leg 62 and second leg 64, second structural beam 68 attaching first leg 62 and second leg 64, wherein first end 70 of second structural beam 68 is attached to distal end 76 of first leg 62, and second end 72 of second structural beam 68 is attached to distal end 82 of second leg 64. Also, first structural beam 66 is proximately positioned to second structural beam 68, attaching first leg 62 and second leg 64 together.

First structural beam 66 also includes a plurality of cutout portions or openings 86 which are configured to provide for mass reduction of the brace without jeopardizing the structural strength of first structural beam 66 and the brace. As stated hereinabove, reduction in the mass of the vehicle components results in the reduction of the vehicle weight, reduced manufacturing costs, and ultimately, in increased fuel efficiency.

It should be appreciated that center structural brace 60 not only provides for a load path in the direction of arrow 87, but also may be utilized as a platform for integrally assembling vehicle interior components such as radio cassette players thereon. In order to facilitate such integral installation, center structural brace 60 includes a plurality of installation flanges 88 attached to and extending outwardly from first leg 62 and second leg 64. Installation flanges 88 may be designed in various shapes and configurations depending on manufacturers' needs and the type of components that are to be accommodated thereon.

As stated hereinabove, second structural beam 68 is attached to first leg 62 at distal end 76 and to second leg 64 at distal end 82, wherein second structural beam 68 is the attachment location of center structural brace 60 to structural member 10 and steering column support structure 12.

Second structural beam 68 is made of a first elongated piece 90, which provides for a seating surface for structural member 10, and a second elongated piece 92 attached perpendicular to first elongated piece 90 and extending upwardly from first elongated piece 90. Second elongated piece 92 comprises a plurality of apertures 94 for receiving a fastening means such as screws, bolts and nuts, or studs for securing center structural brace 60 to structural member 10.

A stud plate 96 is utilized for attaching center structural brace 60, structural member 10, and steering column support structure 12. Stud plate 96 is preferably manufactured of a metal material such as steel having sufficient structural strength and rigidity. Stud plate 96 has a first end 98 and a second end 100 where in the assembled configuration, first end 98 of stud plate 96 is proximate to first end 70 of second structural beam 68, and second end 100 of stud plate 96 is proximate to second end 72 of second structural beam 68.

Stud plate 96 also comprises a stud disposed on the plate where each stud 102 preferably extends upwardly and perpendicular to the plate. Stud 102 is adapted to be received within a corresponding stud receiving aperture 94 disposed along second elongated piece 92 of second structural beam 68 and along the edge of cross car structural member 10.

As best illustrated in FIGS. 4–8, stud plate 96 is positioned on rear side 22 of structural member 10 in such configuration that structural member 10 is sandwiched between stud plate 96 and second elongated piece 92 of second structural beam 68, which is on front side 24 in the assembled configuration. Stud plate 96 also has a slight curvature beyond stud 102 which matches over a curved surface on structural member 10 and provides for a secure and snug fit for the structural member between the stud plate and the center brace structure.

In order to provide a securing means for steering column support structure 12, center brace structure 60, and structural member 10 through stud plate 96, stud plate 96 includes a directional tab 104 disposed on first end 98 and is configured to be received within a tab-receiving opening 106 on bolt flange 56 of second mounting arm 48. Tab 104 provides for easy assembly and positioning of stud plate 96, as well as stud 102, inside apertures 94. Stud plate 96 is further secured to steering column support structure 12 with a bolt 108 inserted through hole 58 on bolt flange 56 of second mounting arm 48 and secured to the stud plate with a nut 110 tightened on bolt 108.

It should be appreciated that stud plate 96 provides for easy, fast, and secure attaching of center structural brace 60 to structural member 10 and steering column support structure 12 by utilizing the studs as fastening means.

Stud plate 96 travels through structural member 10 or a plurality of members which comprise structural member 10, and secures center structural brace 60 to the same through the use of a bolt or plurality of bolts and complementary nuts. As an alternative, center structural brace 60 is secured to structural member 10 through the use of a mechanical fastening means, including but not limited to fasteners, studs, rivets, screws, etc.

As yet another alternative, center structural brace 60 is secured to structural member 10 through the use of an adhesive material or other type of chemical bonding. In applications where center structural brace 60 and structural member 10 are constructed out of polymers, the same may be secured to each other through the use of ultrasonic welding.

In addition, and as yet another alternative, center structural brace 60 is molded integrally with structural member 10 as well as column support structure 12.

The present invention therefore provides a simple, yet effective system for providing load dispersement at the point of attachment between the steering column support assembly and the structural member. The present invention consequently does not require the manufacturer to sacrifice the structural rigidity of the structural member and the steering column support structure.

Moreover, center structural brace 60 supports the weight of the steering column to an extent by providing a structural load path from the structural member and steering column support structure to the floor of the vehicle. This way, the magnitude of the load carried by the steering column support structure and the structural member alone, is reduced, thereby reducing the strain and stress on these structural components.

Figure 9:
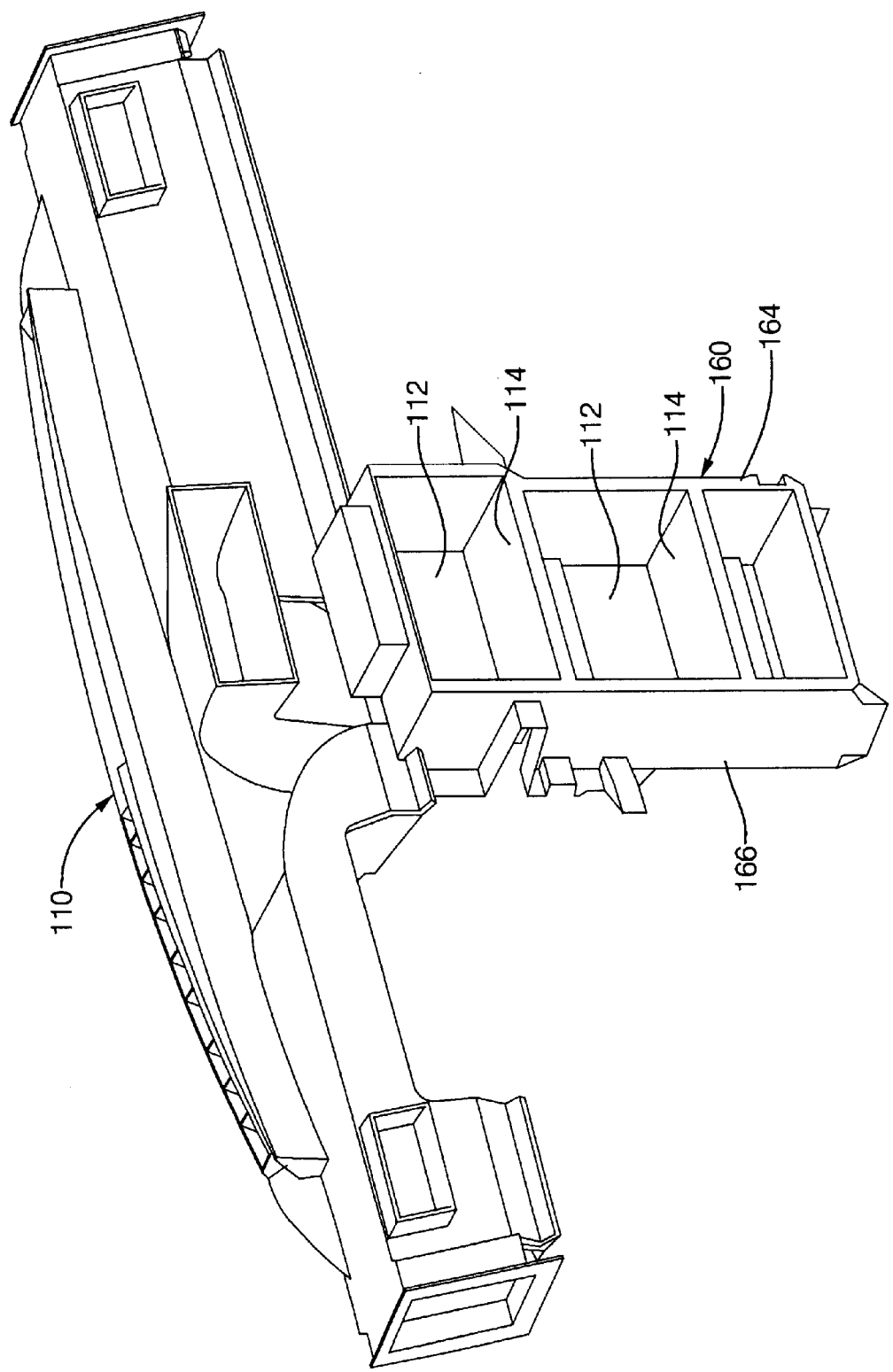
FIG. 9 is a perspective view of an alternative embodiment of a center structural member.
Figure 10:
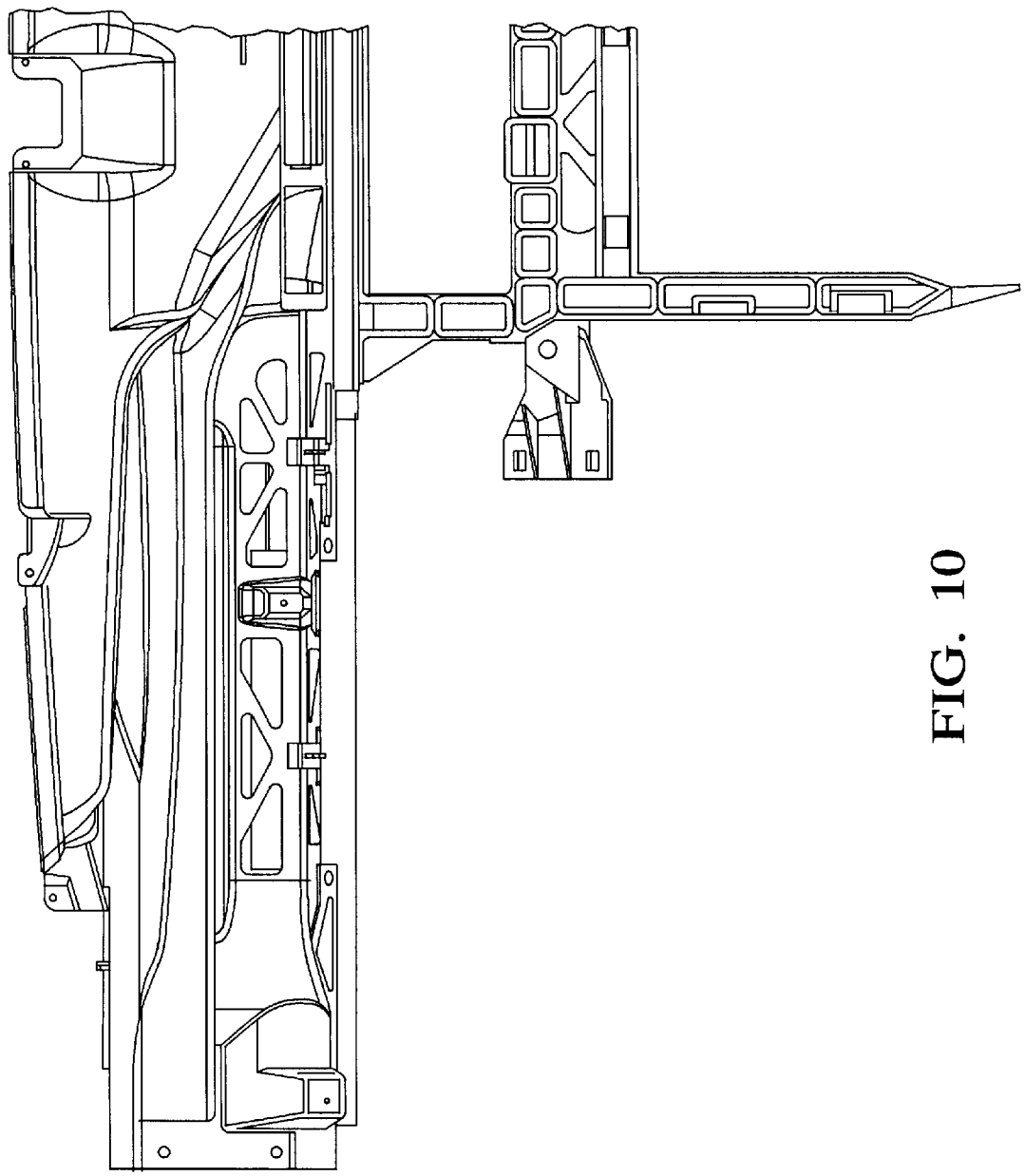
FIG. 10 is an enlarged view of a portion of FIG. 7.
Figure 11:
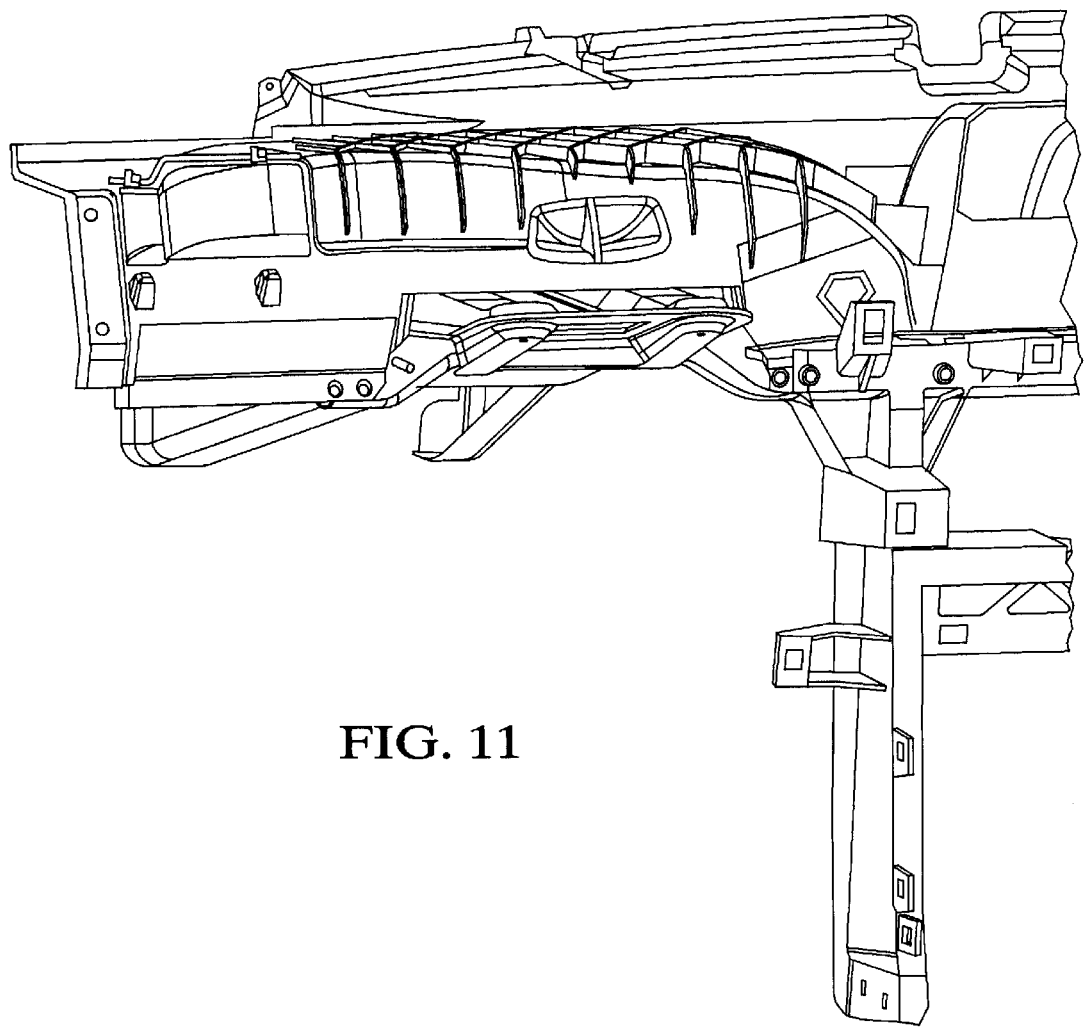
FIG. 11 is an enlarged view of a portion of FIG. 6.
Figure 12:
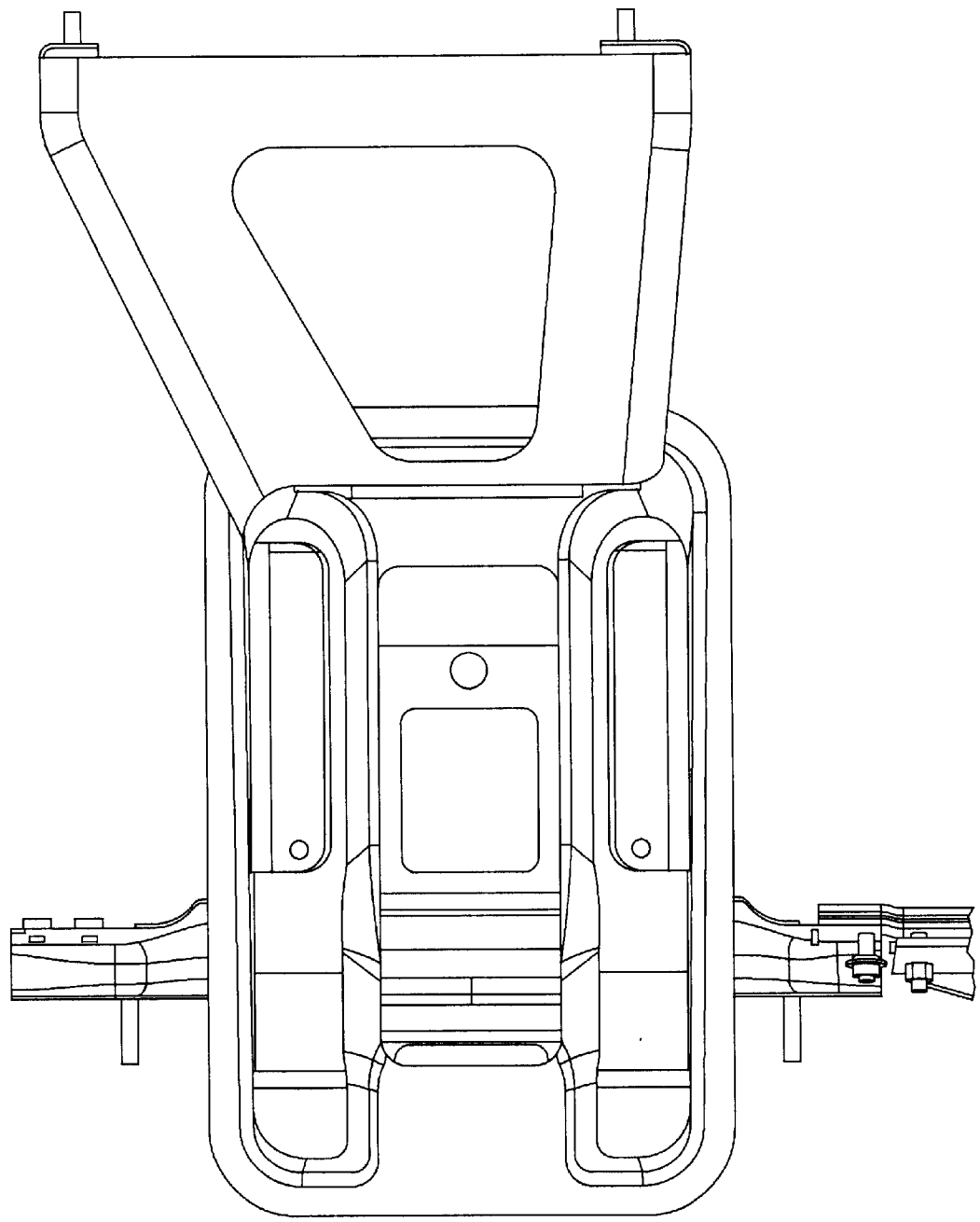
FIG. 12 is an enlarged view of a portion of FIG. 8.
Figure 13:
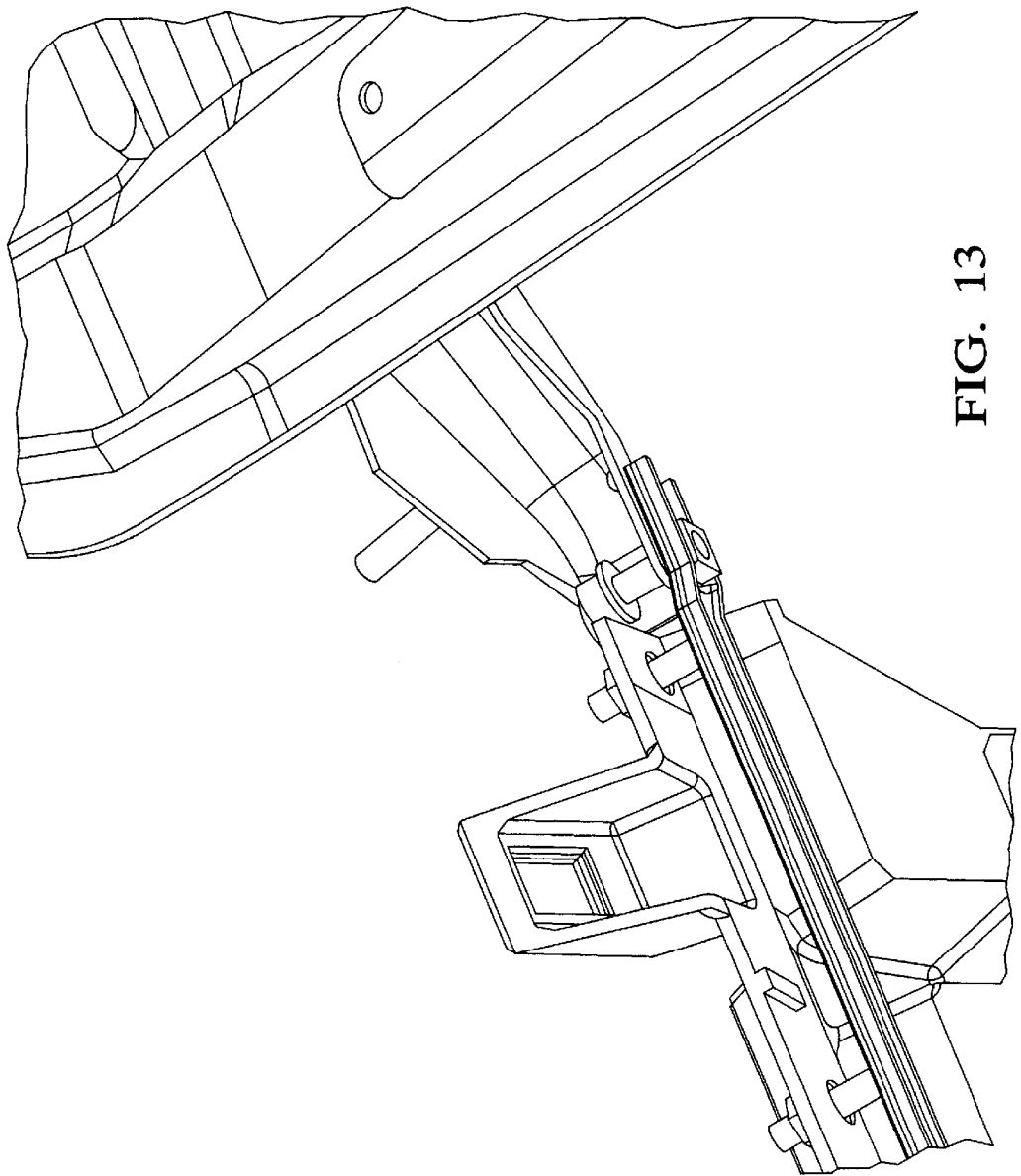
FIG. 13 is a view of an attachment point for the center structural member portion.

Referring now to FIG. 9, an alternative embodiment of the center structural brace is illustrated. Here, component parts performing similar or analogous functions are numbered in multiples of 100. Center structural brace 160 includes a plurality of openings 112 separated by a plurality of plates 114 extending in between and attaching to first leg 162 and second leg 164. Openings 112 provide for installation sites of radio cassette players, CD players, and other interior vehicle components.

While preferred embodiments have been shown and described, various modifications and substitutions may be made thereto without departing from the spirit and scope of the invention. Accordingly, it is to be understood that the present invention has been described by way of illustration only, and that such illustrations and embodiments as have been disclosed herein are not to be construed as limiting to the claims.

What is claimed is:

1. A structural member for providing a first structural load path for a structural system of a vehicle, comprising:
    a) a pair of side members for making contact with a portion of a vehicle frame at one end and being secured to said structural system at the other end; and
    b) a center brace portion being secured to one of said pair of side members at one end and to the other one of said pair of side members at the other end, said structural system includes a cross car structural beam and a steering column support structure, said cross car structural beam providing a second structural load path, said structural member being secured to said cross car structural beam at a point intermediate to a driver side compartment and a passenger side compartment of said vehicle, said steering column support structure being secured to said cross car structural beam and said structural member providing a third structural load path.

2. The structural member as in claim 1, further comprising a structural beam attached to said pair of side members and providing an area for securing said structural member to said cross car structural beam.

3. The structural member as in claim 1, wherein said portion of the vehicle frame is a vehicle interior floor.

4. The structural member as in claim 2, further comprising a stud plate having a plurality of studs extending therefrom, said stud plate securing said structural member to said cross car structural beam and said steering column support structure.

5. The structural member as in claim 4, wherein said plurality of studs pass through a plurality of openings in said structural beam and said cross car structural beam.

6. The structural member as in claim 1, wherein said side members each have an installation flange providing an integral attachment site for vehicle interior components.

7. The structural member as in claim 1, wherein said steering column support structure provides the third structural load path to an engine compartment wall of said vehicle.

8. A structural brace for providing a structural load path in a vehicle, comprising:
    a) a pair of structural members for making contact with a portion of a vehicle frame at one end and being secured to a vehicle structural system at the other end;
    b) a center brace portion being secured to one of said pair of structural members at one end and to the other one of said pair of structural members at the other end; and
    c) a structural beam attached to said pair of side members, said structural beam providing an area for securing said structural brace to a cross car structural beam of said vehicle, wherein said cross car structural beam provides a pathway for a plurality of heating, ventilating and air-conditioning ducts.

9. The structural brace as in claim 8, wherein said structural brace is integrally molded into said cross car structural beam.

10. The structural brace as in claim 8, wherein said structural brace is welded to said cross car structural beam.

11. The structural brace as in claim 8, wherein said cross car structural beam is formed through an extrusion deposition compression molding process.

12. The structural brace as in claim 11, wherein said structural brace is formed through an extrusion deposition compression molding process.

13. The structural brace as in claim 8, wherein said structural brace and said cross car structural beam are formed integrally through an extrusion deposition compression molding process.

14. A structural brace as in claim 8, wherein said cross car structural beam is mounted to "A pillars" of a frame of said vehicle.

15. A structural brace as in claim 8, further comprising: a steering column support structure, said steering column support structure being secured to said cross car structural beam and providing another structural load path.

16. A structural brace for providing a structural load path in a vehicle, comprising:
    a) a pair of structural members for making contact with a portion of a vehicle frame at one end and being secured to a vehicle structural system at the other end;
    b) a center brace portion being secured to one of said pair of structural members at one end and to the other one of said pair of structural members at the other end;
    c) a structural beam attached to said pair of side members, said structural beam providing an area for securing said structural brace to a cross car structural beam of said vehicle, said cross car structural beam being mounted to "A pillars" of a frame of said vehicle; and
    d) a steering column support structure, said steering column support structure being secured to said cross car structural beam and providing another structural load path, wherein said steering column support structure, said cross car structural beam, and said structural brace are secured to each other by a stud plate having a plurality of studs extending therefrom.

17. A structural system for use in a vehicle, comprising:

a structural member configured to traverse a width of the vehicle for securement to A-pillars of a frame of the vehicle;

a steering column support member having a first portion, a second portion, and a third portion, said first portion being secured to a surface of said structural member, said second portion being configured for securement to an engine wall of the vehicle, and said third portion being configured for securement to a steering column of the vehicle; and a brace member having a first leg, a second leg, a first beam, and a second beam, said second beam securing a top end of said first and second legs to one another, a bottom end of said first and second legs being configured for securement to a floor of the vehicle, said first beam securing said first and second said legs to one another at a point between said top and bottom ends, said brace member being secured to said structural member and said steering column support member such that the structural system provides load paths to said structural member and said steering column support member through said A-pillars, said engine wall, and said floor.

18. The structural system as in claim 17, wherein said structural member defines a plurality of fluid passageways therein.

19. The structural system as in claim 17, wherein said brace member is molded integrally with said structural member and said steering column support member.

20. The structural system as in claim 17, further comprising a stud plate configured to secure said brace member to said structural member and said steering column support member.

21. The structural system as in claim 20, wherein said structural member is sandwiched between said stud plate and said second beam.

22. The structural system as in claim 20, wherein said stud plate includes a tab portion, said tab portion being configured for receipt in a tab-receiving opening of said steering column support member.

23. The structural system as in claim 17, wherein said brace member provides one or more integral attachment sites for interior components of the vehicle.

24. The structural system as in claim 17, wherein said brace member comprises a plurality of openings separated by a plurality of plates, said plurality of plates extending in between and attaching to said first leg and said second leg, said plurality of openings providing installation sites interior components of the vehicle.

* * * * *